United States Patent [19]
Kishner

[11] Patent Number: 5,218,423
[45] Date of Patent: Jun. 8, 1993

[54] METHOD AND APPARATUS FOR GENERATING A PLURALITY OF RADIATION BEAMS FROM INCIDENT RADIATION IN A MULTIPLE WAVELENGTH INTERFEROMETER

[75] Inventor: Stanley J. Kishner, Pomona, N.Y.

[73] Assignee: Hughes Aircraft Company, Los Angeles, Calif.

[21] Appl. No.: 766,681

[22] Filed: Sep. 27, 1991

[51] Int. Cl.$^5$ .............................................. G01B 9/02
[52] U.S. Cl. ................................. 356/354; 356/359; 356/363; 359/571
[58] Field of Search ............... 356/354, 358, 359, 360, 356/363; 359/566, 569, 571

[56] References Cited

U.S. PATENT DOCUMENTS

| | | | |
|---|---|---|---|
| 4,022,532 | 5/1977 | Montagnino | 356/363 |
| 4,486,096 | 12/1984 | Endo et al. | 356/225 |
| 4,886,341 | 12/1989 | Oishi et al. | 356/571 |
| 5,080,490 | 1/1992 | Manhart | 356/360 |

Primary Examiner—Samuel A. Turner
Attorney, Agent, or Firm—Michael W. Sales; Wanda Denson-Low

[57] ABSTRACT

A beam-slicer (6) for generating a plurality of radiation beams, or pencil beams (7), from incident radiation (3). Each of the beams is directed to a different region of space. The beam-slicer includes a substrate (17) that, for a transmission grating embodiment, is comprised of a material that is substantially transparent to incident radiation having wavelengths of interest. The substrate includes a plurality of regions, or sub-apertures (8), formed within a surface thereof, each of the regions defining a blazed transmission or reflection grating for deviating incident radiation into a radiation beam. The blazed diffraction grating is formed such that the wavelengths of interest within each radiation beam are simultaneously deviated at a same, predetermined angle. Also disclosed is a Sample Point Interferometer that includes the beam-slicer. The beam-slicer generates pencil beams, each of which is directed to a retroreflector (9) positioned upon a surface of a structure (10) under measurement.

13 Claims, 2 Drawing Sheets

METHOD AND APPARATUS FOR GENERATING A PLURALITY OF RADIATION BEAMS FROM INCIDENT RADIATION IN A MULTIPLE WAVELENGTH INTERFEROMETER

FIELD OF THE INVENTION

This invention relates generally to optical devices and, in particular, relates to multiple light beam generation and to interferometric apparatus employing multiple light beams.

BACKGROUND INVENTION

Conventional approaches to generating multiple narrow beams of radiation, or pencil beams, with wavelengths in each beam being deviated by the same angle, with respect to an incident angle of a main beam, include the following.

In a mirror array approach multiple beams are generated in reflection. However, accurate deviation angles are difficult to achieve without individually adjusting the mirrors. If a small beam size is desired mirror adjustment becomes difficult. Additionally, the illuminating optics may obscure light reflected at small deviation angles.

In a prism array approach multiple beams are generated in transmission and beam deviation is accomplished with refraction. The accuracy of deviation is difficult to control, requiring extremely accurate wedge angles. The equality of deviation of multiple wavelengths is limited by the dispersion of a selected prism material and becomes more difficult to accomplish as additional wavelengths are introduced. Additionally, the dispersion of some materials is temperature-dependent.

In a Fresnel prism approach the functionality of the prism array is provided with an array of Fresnel prisms, which are typically manufactured by replication processes. However, material dispersion effects still limit the accuracy with which multiple wavelengths in each beam are deviated.

Another approach employs binary optics wherein an array of phase gratings, each comprising $2^N$ discrete phase steps, where N is an integer, are made photolithographically. While the grating period can be made very accurately, different wavelengths are deviated by different angles, due to diffractive dispersion. Furthermore, a requirement for providing deviation angles near 10°, and the desirability of using semiconductor laser diode sources with wavelengths near 0.8 micrometers, results in required grating spatial frequencies on the order of 300 lines/mm. The fabrication of binary optics having such spatial frequencies, and $N>1$, is presently both difficult and expensive to achieve. Also, a binary optic with two levels ($N=1$) is, at best, only 40% efficient in any one diffractive order.

Holograms have also been employed to provide multiple beams. However, holograms are generally expensive to produce and fabricate. Also, multiple color holograms further increase expense.

It is also noted that a conventional diffraction grating can deviate multiple wavelengths such that one diffraction order of each may coincide at the same angle. However, in that conventional diffraction gratings are usually blazed for the first diffraction order, this is an inefficient process, especially when attempting to provide higher diffraction orders of closely spaced wavelengths. That is, the resulting higher diffraction order optical signals may be at such low levels as to be unusable.

It is thus an object of the invention to overcome these problems and to provide method and apparatus that generates, in an efficient manner, multiple beams having equal deviation angles for multiple wavelengths.

It is another object of the invention to employ blazed diffraction gratings for creating multiple beams in an efficient manner.

It is a further object of the invention to employ blazed diffraction gratings for creating multiple sample beams for use in a multiple-wavelength interferometer.

SUMMARY OF THE INVENTION

The foregoing and other problems are overcome and the objects of the invention are realized by method and apparatus that employs blazed diffraction gratings for creating multiple beams for use in, by example, a multiple-wavelength interferometer. An array of blazed diffraction gratings, operating in either transmission or reflection, generates and deviates each of a plurality of light beams such that multiple wavelengths of interest within each beam are simultaneously deviated at a same, predetermined angle.

The invention provides method and apparatus to generate a set of pencil beams for use in, by example, a multi-wavelength Sample Point Interferometer. The sample beams so generated are employed to illuminate retroreflectors mounted on a structure, such as a segmented mirror, that is to be measured interferometrically.

The advantages bestowed by the practice of the invention include the following: sample beam deviation angles are the same for multiple wavelengths; sample beam deviation angles may be accurately controlled by fabricating the blazed diffraction gratings through a photolithographic process; the sample beams are deviated with very high efficiency; and an array of blazed diffraction gratings may be fabricated as a small, light-weight structure.

In accordance with an aspect of the invention there is provided an optical component, referred to herein as a beam-slicer, for generating a plurality of radiation beams from incident radiation. Each of the radiation beams is directed to a different region of space. The component includes, in a transmission grating embodiment, a substrate comprised of a material that is substantially transparent to incident radiation having wavelengths of interest. The substrate includes a plurality of regions formed within a surface thereof, each of the regions defining a blazed transmission grating for deviating incident radiation passing therethrough into a radiation beam. The blazed transmission grating is formed such that the wavelengths of interest within each radiation beam are simultaneously deviated at a same, predetermined angle.

Each blazed transmission grating is defined by a plurality of grooves spaced apart from one another in a parallel manner. Each of the grooves is fabricated with an angle $\phi$ given by, $$\phi = \text{arc tan}\,[(n-\cos\theta)/\sin\theta],$$

where n is a refractive index of the substrate material for the wavelengths of interest and where $\theta$ is the same diffraction angle for each of the wavelengths of interest.

Each of the blazed diffraction gratings has a plurality of diffraction orders associated therewith, and a ratio of two wavelengths of interest is shown to be equal to a corresponding ratio of two grating diffraction orders.

Another aspect of the invention pertains to a Sample Point Interferometer that includes the beam-slicer of the invention, the beam-slicer generating a plurality of pencil beams each of which is directed to a predetermined retroreflector positioned upon a surface of a structure being interferometrically measured.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

As employed herein a blazed diffraction grating is one having a plurality of parallel grooves, the grooves having a specific profile to optimize the diffraction of incident radiation for a given diffraction order. A diffractive order is created at each angle for which the difference in optical path length of light rays passing through two adjacent grooves is an integral number of wavelengths. By example, for a first diffraction order, the optical path difference equals the wavelength. For the second diffraction order the optical path difference equals two wavelengths, for the third diffraction order the optical path difference equals three wavelengths, etc. Reference is made to a publication entitled "Diffraction Grating Handbook", published by Bausch and Lomb (1977) for a further description of wavelength diffraction order and blazing The blazed diffraction grating of the invention may be either a transmission grating or a reflection grating. The grating may be employed to advantage as a component of a Sample Point Interferometer (SPI), although the use of the invention is not to be construed to only this one important application. A Sample Point Interferometer is described in U.S. Pat. No. 4,022,532, entitled "Sample Point Interferometric System for Optical Figure Monitoring", issued May 10, 1977 to Lucian Montagnino, the disclosure of which is incorporated by reference herein in its entirety.

One use of the SPI is in measuring the phasing and/or figure of large segmented and/or deformable mirror, such as would be used in a large spaceborne telescope. The SPI can also be employed to monitor space structures, where it functions as a multitude of high dynamic range laser gauges. The SPI may also be employed in industrial inspection applications, including applications in the automotive industry.

Figure 1:
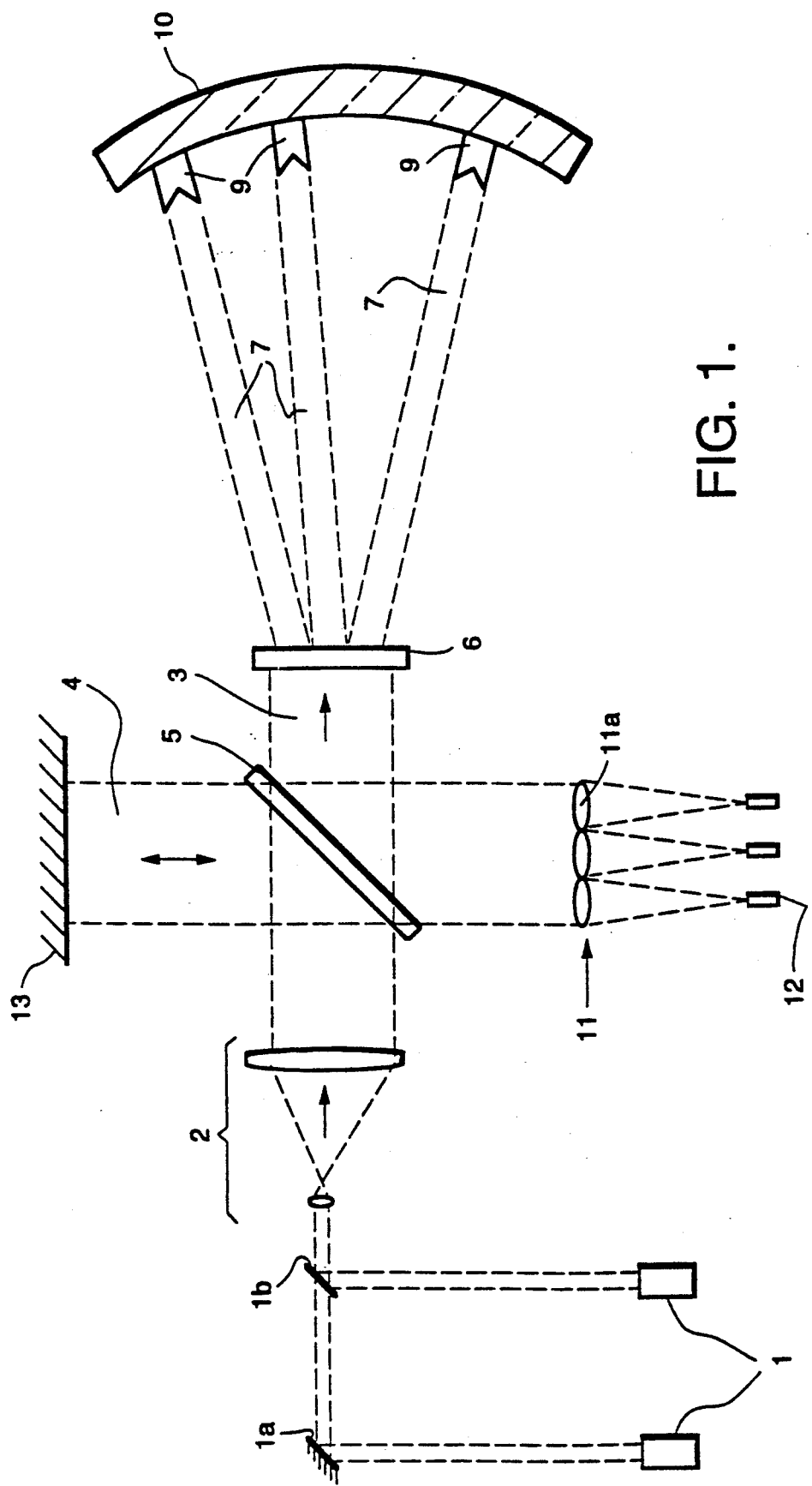
FIG. 1 is is a block diagram of a Sample Point Interferometer constructed in accordance with the invention.

A schematic diagram of an SPI is shown in FIG. 1. A beam-slicer 6 is illuminated by a sample beam 3, which is produced by collimating light from a source. The source may be comprised of a plurality of coherent light sources, preferably laser diodes 1, each operating at one or more wavelengths of interest. The light from the laser diodes 1 is reflected and combined by a mirror 1a and a beamsplitter 1b and is collimated with a beam expander 2 or equivalent apparatus. The collimated light is separated into a measurement or sample beam 3 and into a reference beam 4 with a beamsplitter 5. The purpose of the beam-slicer 6 is to generate and deviate, simultaneously, a plurality of pencil beams 7 from the sample beam 3 which passes through the beam-slicer 6. The pencil beams 7 each intercept a specified retroreflector 9 positioned upon a surface of a structure 10 to be measured The retroreflectors 9 return the pencil beams 7 to the beam-slicer 6, where the beams are deviated again such that they are collinear, in a direction opposite to the original sample beam 3. Reflecting from the beamsplitter 5, each reflected pencil beam is captured by one lenslet 11a of a lenslet array 11. The lenslets 11a form images of the retroreflectors 9 on an array of photodetectors 12. These images interfere with the reference beam 4, after the reference beam 4 is reflected from a reflective optic 13, such as a mirror or a retroreflector. The relative intensities of the interference measured by the photodetectors 12 are employed to determine the relative distances from the beam-slicer 6 to the retroreflectors 9, from which characteristics of the surface of the structure 10 are determinable by known methods.

Alternatively, the reflective optic 13 can be displaced along the direction of the reference beam 4, thereby modulating the intensities of the interference measured by the photodetectors 12. Measurement of the electrical phase of the modulated intensities is employed to determine the relative distances from the beam-slicer 6 to the retroreflectors 9.

Figure 2:
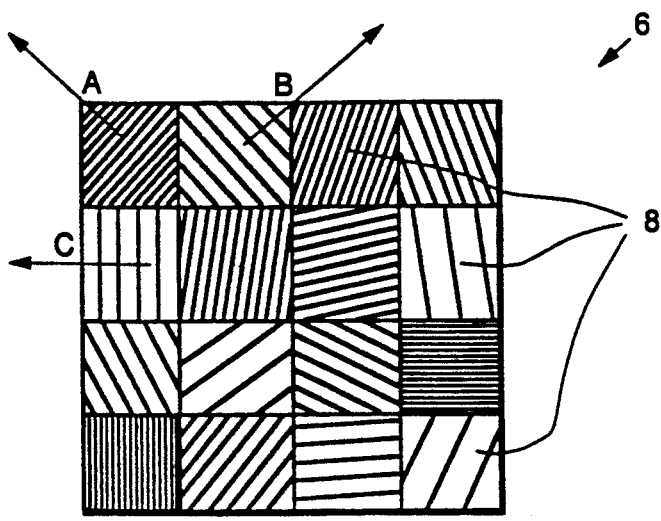
FIG. 2 is a top view of a beam slicer having a plurality of sub-apertures, each of which generates and deviates a single pencil beam.

FIG. 2 is a top view showing in greater detail the beam-slicer 6. Beam-slicer 6 is comprised of substrate selected to be substantially transparent to the wavelengths of interest. Within a surface of the substrate are formed a plurality of sub-apertures 8, each of which generates and deviates a single one of the pencil beams 7. The geometrical arrangement of the sub-apertures 8 is not critical, but can be optimized by fabricating the sub-apertures 8 to be of uniform size and shape in order to equate the signal-to-noise ratio and diffractive properties in each of the pencil beams 7.

In accordance with this embodiment of the invention each sub-aperture 8 of the beam-slicer 6 is a blazed transmission grating, fabricated according to a method that deviates all SPI wavelengths by the same angle, the value of the angle being derived from a requirement for a given one of the pencil beams 7 to intercept a specified one of the retroreflectors 9 on the structure 10. The angle of deviation is perpendicular to the groove pattern of each sub-aperture 8, as indicated by the arrows for the subapertures A, B, and C. For a given sub-aperture 8, the diffraction angle increases with groove spatial frequency, in accordance with the well-known grating equation. By example, for the embodiment of FIG. 2 the diffraction angle for the subaperture designated C is less than that for the subaperture designated B, which in turn is less than that for the subaperture designated A.

A manner in which a blazed transmission grating is designed to deviate multiple wavelengths by the same angle is now illustrated using a two-wavelength example.

An underlying principle of the invention is to employ the grating in high diffraction orders. The diffraction orders are different for the two wavelengths, but are chosen so that the diffraction angles for the two wavelengths are equal. As was previously noted, conventional blazed diffraction gratings are generally very inefficient in the higher diffraction orders, that is, for diffraction orders greater than one.

The grating equation, for normal incidence, is given by $$m\lambda = d \sin \theta \quad (1)$$

where
- m = grating diffraction order;
- $\lambda$ = wavelength;
- d = grating groove spacing; and
- $\theta$ = diffraction angle.

For two wavelengths $\lambda_1$ and $\lambda_2$ to be diffracted by the same angle $\theta$ requires that two equations be satisfied:

$$m_1\lambda_1 = d \sin \theta, \text{ and} \quad (2)$$

$$m_2\lambda_2 = d \sin \theta. \quad (3)$$

Thus, $$m_1\lambda_1 = m_2\lambda_2$$

and $$\lambda_1/\lambda_2 = m_2/m_1 \quad (4)$$

Equation (4) indicates that equal diffraction angles are achieved when the ratio of wavelengths ($\lambda_1/\lambda_2$) is equal to a ratio of integers ($m_2/m_1$). As an example, if $\lambda_1 = 0.76$ micrometers and $\lambda_2 = 0.80$ micrometers, then $\lambda_1/\lambda_2 = 0.76/0.80 = 19/20$. This indicates that if the grating is designed with $m_1 = 20$ and $m_2 = 19$, both wavelengths are diffracted by the angle $\theta$. If, by example, $\theta = 10°$, then, $d = (20)(0.76)/\sin 10° = 87.53$ micrometers.

Any diffraction grating having d chosen from equation (2) or (3) will diffract both wavelengths by the same angle. However, diffraction efficiency is low unless the grating is properly blazed. Diffraction efficiency is important because the beam-slicer 6 is employed in a double-pass configuration in the SPI. That is, the beam-slicer 6 passes light going to and coming from the structure 10 and any losses are thus experienced twice by the light.

Figure 3:
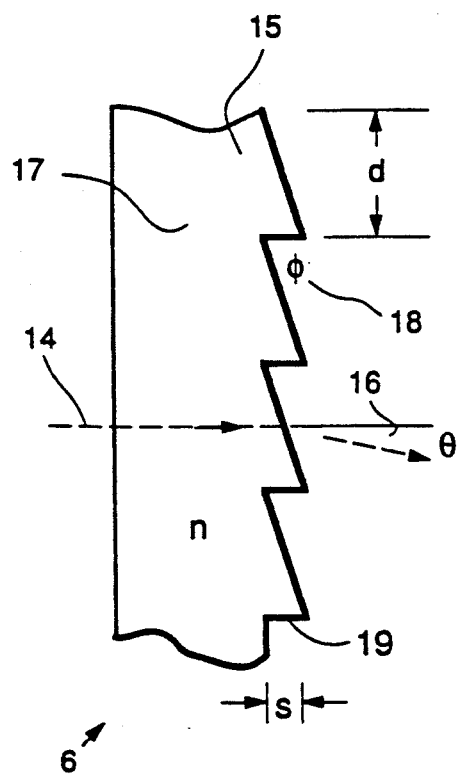
FIG. 3 is a side view of blazed transmission grating embodiment.

Blazing, as indicated in FIG. 3, involves the generation of triangular groove profiles such that the angle at which incident light 14 would normally be refracted by each micro-prism 15 matches the diffraction angle $\theta$ 16. Thus, refraction supports diffraction in the proper diffraction order (m), that is, $m_1$ for $\lambda_1$ and $m_2$ for $\lambda_2$. For a transmission grating substrate 17 having a refractive index n, the grooves are fabricated with an angle $\phi$ 18, given by, $$\phi = \arctan\left[(n-\cos \theta)/\sin \theta\right]. \quad (5)$$

For the instant example, ($\theta = 10°$), if $n = 1.5$, then $\phi = 71.37°$. If $d = 87.53$ micrometers, then the groove depth S 19 equals 29.51 micrometers.

It is important to note that refraction by each microprism 15 affects the efficiency at which light is refracted by the grating, and not the angle of refraction.

The teaching of the invention is extendable to more than two wavelengths by satisfying a system of equations:

$$m_1\lambda_1 = d\sin\theta \quad (6)$$

-continued
$$m_2\lambda_2 = d\sin\theta$$
$$m_j\lambda_j = d\sin\theta.$$

Then, $$m_1\lambda_1 m_2\lambda_2 = \ldots = m_j\lambda_j. \quad (7)$$

Equation (7) imposes additional constraints on the ratios of wavelengths that are permitted. For $j = 3$, there is obtained:

$$m_1\lambda_1 = m_2\lambda_2 = m_3\lambda_3 \quad (8)$$

Then, $$\lambda_1/\lambda_2 = m_2/m_1, \text{ and} \quad (9)$$

$$\lambda_1/\lambda_3 = m_3/m_1.$$

Figure 4:
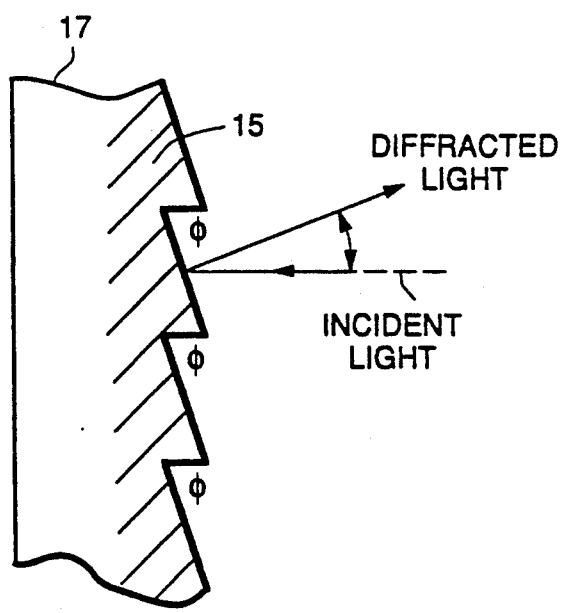
FIG. 4 is a side view of a blazed reflection grating embodiment.

For example, if $\lambda_1 = 0.76$ micrometers, $\lambda_2 = 0.80$ micrometers, and $\lambda_3 = 0.894$ micrometers, then $\lambda_1/\lambda_2 = m_2/m_1 = 19/20$ and $\lambda_1\lambda_3 = m_3/m_1 = 17/20$. The resultant blazed transmission grating operates in the 20th, 19th, and 17th diffraction orders, respectively, for wavelengths $\lambda_1 \lambda_2$ and $\lambda_3$. FIG. 4 shows a side view of a blazed reflection grating embodiment of the invention. In FIG. 4, incident light is diffracted at an angle $\theta$, and the groove angle $\phi$ is determined in accordance with the expression: ps
$$\phi = 90° - (\phi/2). \quad (10)$$

Suitable wavelengths for use with the invention encompass the ultraviolet to the far infrared. The substrate 17 may be comprised of, by example, a suitable optical glass. Each of the sub-apertures 8 has linear dimensions of, by example, approximately 5–10 millimeters.

One method of producing a blazed transmission grating having a triangular groove profile includes a first step of exposing the triangular groove pattern into photoresist, and then transferring the exposed pattern into a glass substrate by ion-beam etching. Photoresists have been formulated to, when developed, exhibit a surface profile that is linearly proportional to exposure. Exposure of the photoresist is typically accomplished with a lamp or laser operating in the ultraviolet portion of the spectrum.

There are a number of suitable methods that can be employed to provide the proper exposure for producing triangular profiles. The exposure should vary linearly across each groove, and should also be constant along each groove. One method is to generate a transmissive mask through which a lamp exposes the underlying photoresist. This mask can be computer-generated, with the linear groove profile achieved with a progression of gray levels. Another method is to photoreduce a triangular aperture onto the photoresist, and then translate the photoresist-coated substrate in a linear fashion. The triangular aperture produces the required linear profile, and linear translation produces one groove. The process may be repeated sequentially, or may use multiple triangular apertures simultaneously to produce multiple grooves. A third method is to scan the photoresist directly with a focussed spot from an ultraviolet laser. Modulation of the intensity of the laser is used to create the linear exposure needed for the triangular groove profile.

Preferably, each required mask is sequentially aligned and exposed to define each of the subapertures 8. The substrate is then developed as an assembly to etch each of the subapertures simultaneously. As described above, an ion beam etching process is preferred. However, it is also within the scope of the invention to employ a wet chemical etch or other suitable technique for forming the grooves within the substrate.

For the blazed reflection grating of FIG. 4 an additional step includes forming a reflective surface over the grooves, such as by applying a layer of metalization.

While the invention has been particularly shown and described with respect to preferred embodiments thereof, it will be understood by those skilled in the art that changes in form and details may be made therein without departing from the scope and spirit of the invention.

What is claimed is:

1. Apparatus for generating a plurality of radiation beams from incident radiation, each of the beams being directed to a different region of space, comprising:
    a substrate; and
    at least one region formed within a surface of said substrate, said at least one region defining a blazed diffraction grating for deviating incident radiation into a radiation beam, wherein, for at least two wavelengths of interest of the radiation beam, the at least two wavelengths of interest are simultaneously and efficiently deviated at a same, predetermined angle in accordance with the expression $\lambda_1/\lambda_2 = m_2/m_1$;

wherein
    $\lambda_1$ and $\lambda_2$ are two wavelengths of interest, and wherein $m_1$ is a diffraction order of $\lambda_1$ and $m_2$ is a diffraction order of $\lambda_2$.

2. Apparatus as set forth in claim 1 wherein said blazed diffraction grating is a blazed transmission grating having a plurality of grooves spaced apart from one another in a parallel manner, and wherein each of the grooves is fabricated with an angle given by, $\phi = \arctan[(n-\cos\theta)/\sin\theta]$, where n is the refractive index of the substrate material for the wavelengths of interest and where $\theta$ is a diffraction angle for each of the wavelengths of interest.

3. Apparatus as set forth in claim 1 wherein said blazed diffraction grating is a blazed reflection grating having a plurality of grooves spaced apart from one another in a parallel manner, and wherein each of the grooves is fabricated with an angle $\phi$ given by, $\phi = 90° - (\theta/2)$, wherein $\theta$ is an angle of diffraction.

4. Interferometric apparatus comprising:
    means for generating a source beam of radiation having at least two constituent wavelengths of interest;
    means for splitting the source beam into a reference beam and into a measurement beam;
    means, optically coupled to said measurement beam, for differentiating the measurement beam into a plurality of pencil beams each of which is directed to a reflective region upon a surface under measurement; and
    means for interferometrically comparing, to the reference beam, each of the pencil beams reflecting back from the surface under measurement so as to determine a distance to each of the reflected regions, wherein
    said differentiating means comprises
    a substrate; and
    at least one region formed within a surface of said substrate, said at least one region defining a blazed diffraction grating for deviating incident radiation into a radiation beam, wherein, for at least two wavelengths of interest of the radiation beam, the at least two wavelengths of interest are simultaneously deviated at a same, predetermined angle in accordance with the expression $\lambda_1\lambda_2 m_2/m_1$;

wherein $\lambda_1$ and $\lambda_2$ are two wavelengths of interest, and wherein $m_1$ is a diffraction order of $\lambda_1$ and $m_2$ is a diffraction order of $\lambda_2$.

5. Interferometric apparatus as set forth in claim 4 wherein each blazed diffraction grating is a blazed reflection grating defined by a plurality of grooves spaced apart from one another in a parallel manner, and wherein each of the grooves is fabricated with an angle $\phi$ given by, $\phi = 90° - (\phi/2)$, wherein is an angle of diffraction.

6. Interferometric apparatus as set forth in claim 4 wherein each blazed diffraction grating is a blazed transmission grating having a plurality of grooves spaced apart from one another in a parallel manner, and wherein each of the grooves is fabricated with an angle $\phi$ given by, $\phi = \arctan[(n-\cos\theta)/\sin\theta]$, where n is the refractive index of the substrate material for the wavelengths of interest and where $\theta$ is a diffraction angle for each of the wavelengths of interest.

7. Interferometric apparatus as set forth in claim 4 wherein said generating means is comprised of a plurality of laser means each of which outputs one or more of said wavelengths of interest.

8. Interferometric apparatus as set forth in claim 4 wherein said generating means includes means for collimating said source beam.

9. Interferometric apparatus as set forth in claim 4 wherein each of said reflective regions includes a retroreflector.

10. Interferometric apparatus as set forth in claim 4 wherein said comparing means includes:
    a plurality of photodetector means disposed for receiving said reference beam; and
    a plurality of lens means individual ones of which are disposed for receiving and directing one of the reflected pencil beams to one of said photodetector means.

11. A method for generating a plurality of radiation beams from incident radiation, each of the beams being directed to a different region of space, comprising the steps of:
    providing a substrate having a plurality of regions formed within a surface of said substrate, each of said regions defining a blazed diffraction grating for deviating radiation incident upon said substrate into a radiation beam;

illuminating the substrate with radiation having at least two wavelengths of interest; and simultaneously deviating at a same predetermined angle the at least two wavelengths of interest within each region so as to form a plurality of radiation beams;

wherein the at least two wavelengths of interest within the radiation beam are simultaneously deviated at a same, predetermined angle in accordance with the expression $$\lambda_1/\lambda_2 = m_2/m_1;$$

wherein $\lambda_1$ and $\lambda_2$ are two wavelengths of interest, and wherein $m_1$ is a diffractive order of $\lambda_1$ and $m_2$ is a diffraction order of $\lambda_2$.

12. A method as set forth in claim 11 wherein each blazed diffraction grating is a blazed transmission grating defined by a plurality of grooves spaced apart from one another in a parallel manner, and wherein the step of providing includes a step of forming each of the grooves to have an angle $\phi$ given by, $$\phi = \arctan[(n-\cos\theta)/\sin\theta],$$

where n is a refractive index of the substrate material for the wavelengths of interest and where $\theta$ is a diffraction angle for each of the wavelengths of interest.

13. A method as set forth in claim 11 wherein each blazed diffraction grating is a blazed reflection grating defined by a plurality of grooves spaced apart from one another in a parallel manner, and wherein the step of providing includes a step of forming each of the grooves to have an angle $\phi$ given by, $$\phi = 90° - (\theta/2),$$

wherein $\theta$ is an angle of diffraction.

* * * * *